June 9, 1959 F. A. KRÖGER ET AL 2,890,142

ASYMMETRICALLY CONDUCTIVE DEVICE

Filed March 30, 1955

INVENTORS
FERDINAND ANNE KRÖGER
DIRK DE NOBEL

BY Fred M. Vogel

AGENT

United States Patent Office 2,890,142

Patented June 9, 1959

2,890,142

ASYMMETRICALLY CONDUCTIVE DEVICE

Ferdinand Anne Kröger and Dirk de Nobel, Eindhoven, Netherlands, assignors, by mesne assignments, to North American Philips Company, Inc., New York, N.Y., a corporation of Delaware Application March 30, 1955, Serial No. 498,024

Claims priority, application Netherlands April 1, 1954

3 Claims. (Cl. 148—33)

This invention relates to asymmetrically conductive devices, and, in particular, to a device comprising a new semi-conductive material.

It has been known to use in the manufacture of photoresistors compounds of cadmium with one of the elements of group VI*b* of the periodic table, for example, sulphur or selenium, in which compounds the lattice distortions determining the photo-conductive properties are produced by incorporating atoms or ions of elements of groups I and/or III*b*, preferably thallium and copper. Among these compounds, substantially the only charge carriers in CdO, CdS and CdSe are electrons; only n-type conductivity material has been produced.

The present invention is based on the discovery that in CdTe, both electrons and holes are charge carriers. That is, CdTe may be made with both n-type and p-type conductivity. Further, the mobility of the charge carriers in the CdTe is higher than in the other cadmium compounds mentioned. Thus, cadmium telluride possesses properties which render it very suitable for use in asymmetrically conductive devices, for example, rectifiers, transistors, photo-electric cells and photo-transistors, all of which are characterized, in accordance with the invention, by a semi-conductive body consisting of cadmium telluride, preferably in the monocrystalline state.

In order to obtain p-conductivity in the CdTe, elements of group I of the periodic table, for example, Li, Na, Cu, Ag and Au may be incorporated in the CdTe. N-conductivity may be obtained by incorporating elements of group VII*a*, for example, Cl, Br and I, of group V*a*, for example, P and Sb, and of group III*a*, for example, Ga and In. As is common in this art, the amounts of the added impurity elements necessary to dope the CdTe are extremely small.

The conductivity may also be altered by producing deviations from the stoichiometric composition of the compound wherein an excess quantity of Te produces p-conductivity and an excess quantity of Cd produces n-conductivity. If desired, this measure may be combined with the addition of doping or impurity elements as referred to above.

In devices according to the invention, it may be important that the semi-conductive body should contain adjacent zones of different, more particularly, of opposite conductivity. For example, a p-n junction in the body may be useful. To this end, the lattice distortions determining the conductivity (foreign atoms and deviations from the stoichiometric composition) may be different in the different zones. For example, as in the technique known in connection with germanium and described as the alloy technique, a small quantity of a donor or acceptor material may be melted down or fused on a particular portion of the cadmium telluride.

The invention will now be described in connection with several specific examples, reference being had to the accompanying drawing, in which.

Several examples will now illustrate different methods for preparing CdTe compounds in accordance with the invention.

*Example 1*

Figure 1:
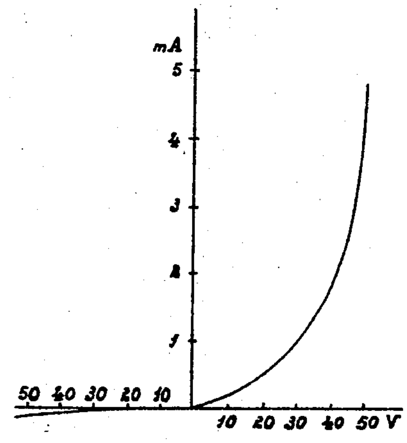
Figs. 1, 2, 3 and 4 show current-voltage characteristic curves of several devices of the invention illustrating the rectifying action obtained.
Figure 5:
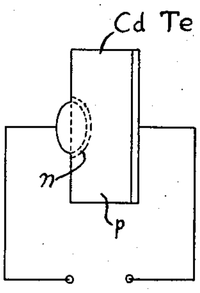
Fig. 5 is a view of a typical asymmetrically-conductive device of the invention.

A CdTe crystal is obtained by segregation from a melt under a Cd pressure of 1 atmosphere, which crystal exhibits p-conductivity. A grain or dot of In is placed on the surface of the crystal and melted at 500° C. in a flow of nitrogen. For 10 minutes, this temperature of 500° C. is maintained, after which the crystal is cooled. By this technique, a portion of the CdTe underlying the In is converted to n-type material. Thus, a p-n junction is produced within the CdTe crystal. A rectifier is obtained, as shown in Fig. 5, by providing ohmic connections to the CdTe body itself and to the In containing portion thereof, which rectifier exhibited the current-voltage characteristic curve shown in Fig. 1.

*Example 2*

Figure 2:
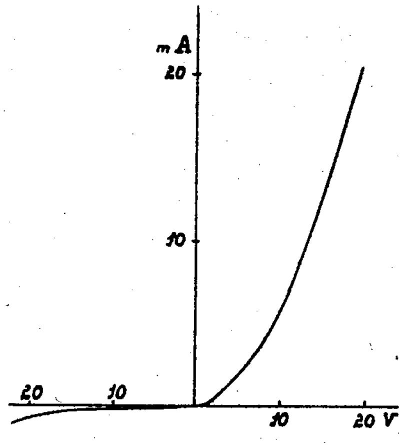

A p-conductive CdTe crystal, obtained in the manner referred to in Example 1, is heated under a Cd pressure of 2 atm. at a temperature of 900° for 5 hours; by absorbing excess Cd, it thus becomes homogeneously n-conductive. On this crystal, a grain of Te is melted at 500° C. in a nitrogen atmosphere. This temperature is maintained for 10 minutes; then the crystal is cooled. Underneath the Te grain, the CdTe crystal absorbs excess Te, thus producing p-type material and a p-n junction in the crystal. Contacts are then applied to the Te and to the CdTe body to produce a rectifier exhibiting the current-voltage characteristic curve shown in Fig. 2.

*Example 3*

Figure 3:
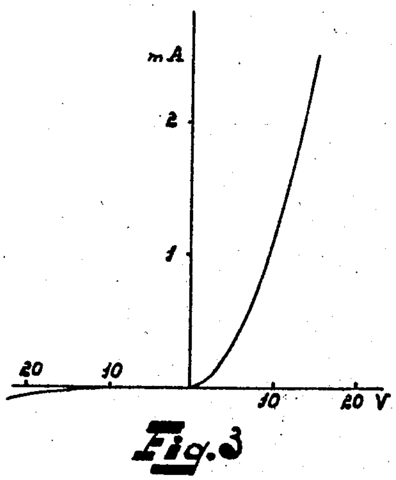

A p-conductive CdTe crystal obtained in the manner referred to in Example 1 is heated under a Cd pressure of 2 atm. at 900° C. for 30 minutes. Thus, an external layer of the crystal of about $500\mu$ in thickness becomes n-conductive. Therefore, in the interior of the crystal, a p-n junction is produced. Ohmic connections are then made to the p and n portions to produce a rectifier exhibiting the current-voltage characteristic curve shown in Fig. 3.

Exposure of the p-n junction by 1000 Lux of white light produces a photo-electromotive force of about 500 mv. at a photocurrent of $7\mu a$.

*Example 4*

Figure 4:
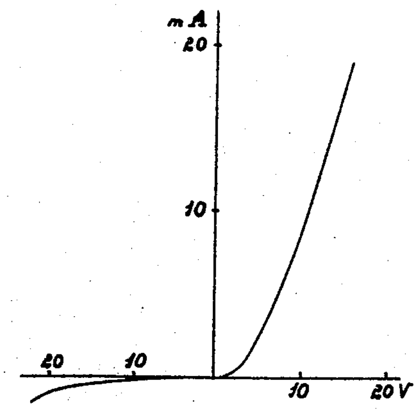

CdTe containing about $10^{18}$ atoms of In per $cm.^3$ is melted in a closed, evacuated quartz vessel at 1050° C. under a Cd pressure of 1 atm. By sublimation, a layer of n-type CdTe-In is deposited on a quartz supporting plate, maintained at a temperature of about 900° C. Then, the Cd pressure is reduced to 0.3 atm., and on the layer previously produced, a layer of CdTe-In with p-conductivity is deposited, thereby producing a p-n junction within the combination. Exposure of the p-n junction by 1000 Lux of white light produces a photo e.m.f. of about 500 mv. As a rectifier the product obtained exhibits a characteristic as is shown in Fig. 4.

While we have described our invention in connection with specific embodiments and applications, other modifications thereof will be readily apparent to those skilled in this art without departing from the spirit and scope of the invention as defined in the appended claims.

What is claimed is:

1. An asymmetrically conductive device comprising a semi-conductive body of CdTe exhibiting one type of conductivity, a portion of said body containing an excess amount of an elemental constituent of said body and conductivity-determining impurities and exhibiting the opposite type of conductivity, and terminal connections to said body at areas exhibiting the different types of conductivity.

2. An asymmetrically-conductive device comprising a monocrystalline semi-conductive body of CdTe, a portion of said body exhibiting p-conductivity type value, another portion of said body exhibiting the opposite conductivity type by reason of the presence of excess cadmium, and electrode connections to said portions of opposite conductivity.

3. A semi-conductive device comprising a single crystal, semi-conductive body consisting of cadmium telluride, said body containing contiguous p-type and n-type portions forming a p-n junction, said p-type portion exhibiting that conductivity by reason of the presence therein of excess tellurium.

References Cited in the file of this patent

UNITED STATES PATENTS

| | | |
|---|---|---|
| 2,817,799 | Jenny | Dec. 24, 1957 |
| 2,840,496 | Jenny | June 24, 1958 |

FOREIGN PATENTS

| | | |
|---|---|---|
| 1,057,038 | France | Oct. 28, 1953 |

OTHER REFERENCES

Chemical Abstracts, vol. 46, p. 9413*e*.

Journal of Applied Physics, vol. 24, 1953, p. 1411.